Dec. 6, 1960  E. R. ANDIS  2,963,016
CATAPULT TYPE BAIT CASTER
Filed Jan. 26, 1956   2 Sheets-Sheet 1
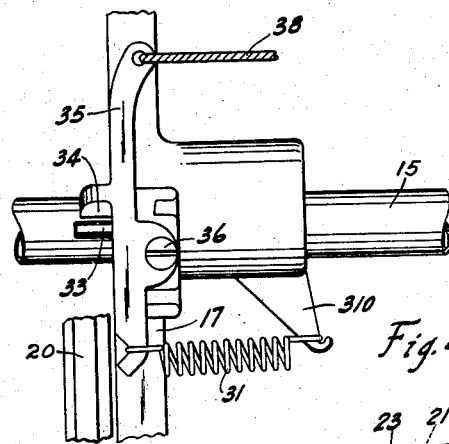
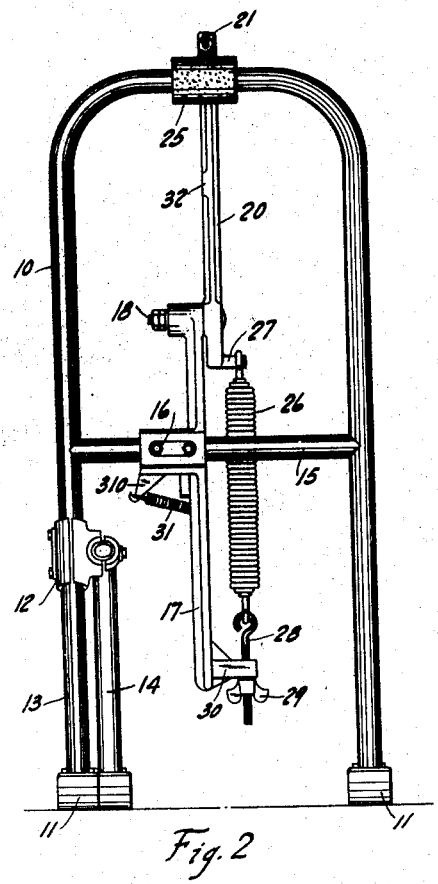
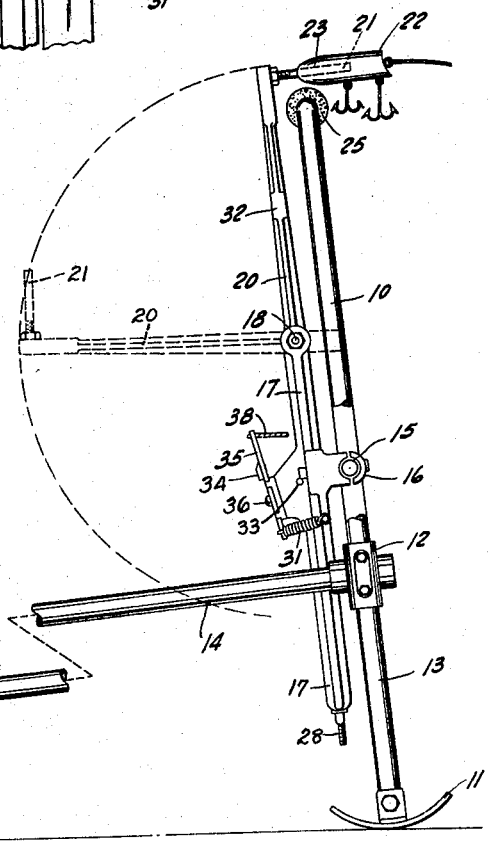
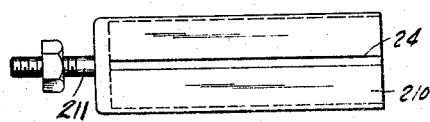
INVENTOR.
ERNEST R. ANDIS
BY
Wheeler, Wheeler & Wheeler
ATTORNEYS Dec. 6, 1960  E. R. ANDIS  2,963,016
CATAPULT TYPE BAIT CASTER
Filed Jan. 26, 1956  2 Sheets-Sheet 2

INVENTOR.
ERNEST R. ANDIS
BY
Wheeler, Wheeler & Wheeler
ATTORNEYS

United States Patent Office 2,963,016
Patented Dec. 6, 1960

2,963,016

CATAPULT TYPE BAIT CASTER

Ernest R. Andis, Racine, Wis., assignor to Andis Clipper Co., Racine, Wis., a corporation of Wisconsin Filed Jan. 26, 1956, Ser. No. 561,479

5 Claims. (Cl. 124—7)

This invention relates to a catapult type bait caster. The device is particularly useful in surf fishing and the like. A number of people desirous of engaging in the sport are incapable of handling the heavy equipment normally required. The present device comprises a catapult arm upon which the bait may be placed, a frame upon which the arm is pivoted and which includes a stop for abruptly arresting arm movement to project the bait, and means for relative variation of the position of the stop in the path of arm movement whereby the trajectory of the bait can be predetermined.

In two of the three embodiments herein disclosed, the catapult arm is subject to spring bias which operates it to the stop position. In one of these, the spring is tensioned after the arm is retracted. Both of these embodiments include a catch for holding the arm in its retracted position and releasing it abruptly for movement to the stop.

The third device is more simple and it includes means whereby the operator's foot furnishes the motive power for actuating the catapult.

In the drawings:

Fig. 1 is a view in side elevation of a device embodying the invention.

Fig. 2 is a view of the same device in front elevation.

Fig. 3 is a detail view in plan of the bait holder at the end of the catapult arm.

Fig. 4 is a fragmentary detail view on an enlarged scale showing the latch mechanism.

Figure 7:
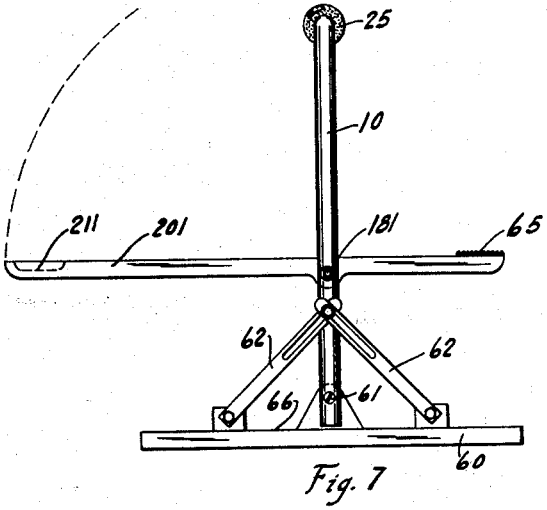
Fig. 7 is a view on a reduced scale showing in side elevation a third embodiment of the invention.

Each of the embodiments shown in Figs. 1 to 6 comprises a frame 10 in the form of an inverted U desirably provided at the lower ends of its legs with shoes 11 to keep the frame from sinking into soft ground or sand. A clamp 12 attached to leg 13 of the U-shaped frame adjustably connects to such leg a rearwardly extending bar 14 which is downwardly curved at its rear end to provide a third leg desirably provided with a third shoe 11. The adjustment of bar 14 through the clamp 12 will determine the angle of the nearly upright frame 10.

The frame comprises a crossbar 15 to which is clamped at 16 a bracket 17 extending generally in an upright direction along the frame. Pivoted thereto by means of bolt 18 near the upper end of the bracket is a catapult arm 20 which is provided at its outer free end with a bait holder 21 of any desired form. In the device illustrated, the bait holder 21 comprises a short length of rod for which the bait or lure 22 may be provided with a socket 23. The alternative form of bait holder shown at 210 in Fig. 3 has a form of a semi-tubular cup provided with a line slot at 24. It has a mounting screw 211 which may be used alternatively with that of the peg 21 to connect the appropriate bait holder with the free end of the catapult.

A heavy bumper 25 of rubber or the like is fastened on the top of frame 10 in the path of swinging movement of the catapult arm 20. The arm is biased toward said bumper by means of a heavy spring 26 which has an anchorage 27 at the lower end of the catapult arm below its fulcrum on pintle 18. Spring 26 is adjustably tensioned by means of an eyebolt 28 and wing nut 29, the latter being engaged with an anchorage ear 30 at the lower end of the bracket 17 as best shown in Fig. 2.

To cock the catapult, the arm 20 is pulled counterclockwise as viewed in Fig. 1 until its latch pad 32 abuts stop pin 33 and is held beneath the dog portion 34 of the detent lever 35. The latter is pivoted at 36 to the bracket 17 as best shown in Fig. 4. The lever is subject to the bias of a tension spring 31 fastened to the anchorage 310 of the bracket and adapted to hold the latch dog 34 securely over the latch pad 32 of the catapult arm, subject to release when the detent lever 35 is oscillated clockwise as viewed in Fig. 4. Desirably such release is effected by means of a lanyard 38 connected to the upper end of lever 35.

With the catapult arm cocked and retained by the detent lever 35, and the bait in place on the holder 21 or 210, and the frame 10 adjusted by means of bar 14 to position the stop 25 for the desired trajectory of bait discharge, the operator pulls the lanyard. This releases the arm 20, which moves with extremely high velocity to the stop 25 and is then abruptly arrested. The bait is thereby hurled outwardly at the desired upward and forward angle. The feet 11 on the frame 10 and bar 14 tend to maintain the selected angular position of the bumper 25, which might otherwise be destroyed by the sinking of one or more of the feet into the sand or soft earth.

Figure 6:
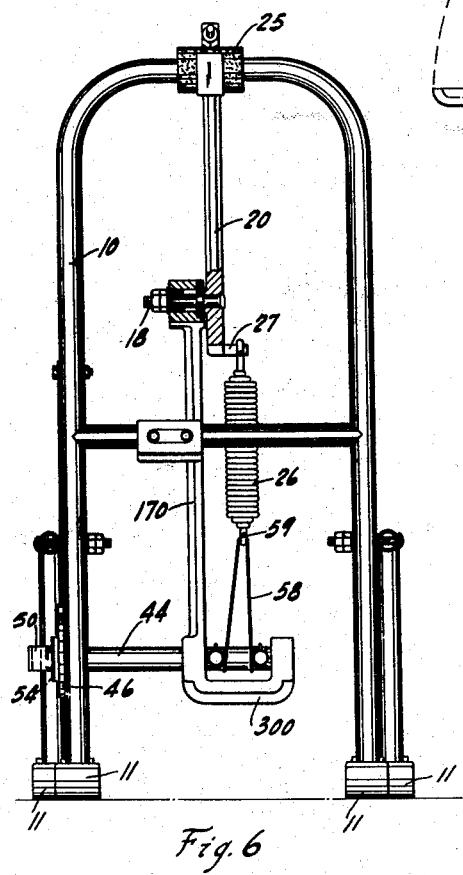
Fig. 6 is a view in front elevation of the device of Fig. 5.
Figure 5:
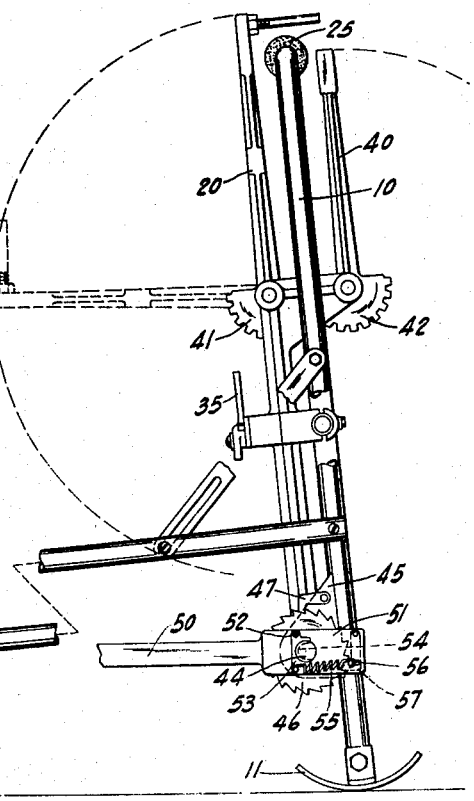
Fig. 5 is a side elevational view similar to Fig. 1 showing a modified embodiment of the invention.

In the device shown in Figs. 5 and 6, the frame 10 is essentially the same as that already described, and the catapult arm 20 is similarly mounted and similarly held by detent lever 35 for release to engage the bumper 25. However, to neutralize the impact of the catapult arm 20 on the bumper 25, I provide in the device of Figs. 5 and 6 a counter moving arm 40 connected by gear segments 41 and 42 to the catapult arm 20 to move oppositely with respect thereto. The arrangement is desirably such that when the catapult arm is released by the detent latch 35, the two arms 20 and 40 will move in opposite directions at the same rate to strike the bumper 25 in opposite directions at the same time. Thus, the shock which might displace frame 10 from its selected position is neutralized in the bumper.

Another modification illustrated in this embodiment consists in an arrangement whereby the spring 26 can be tensioned by gradual increments after the catapult arm 20 has been cocked by engaging it beneath the dog of the detent lever 35. The bracket 170 has an anchorage arm 300 provided with bearings and a shaft 44 which extends outwardly to the side of the frame where it extends through a bearing plate 45 welded to the frame as shown in Fig. 5. Outside of the frame, the shaft 44 carries a ratchet wheel 46, the teeth of which are successively engaged by pawl 47 pivoted to the plate 45.

Hand lever 50 is detachably pivoted on shaft 44. The handle has a mounting portion 51 apertured to receive the shaft. Pivoted to the portion 51 at 52 is a latch plate 53 having a notch engageable in the groove 54 of shaft 44. A spring 55 engages the latch plate 53 to bias it into such engagement to maintain the assembly. At its outer end, the spring 55 is anchored on a peg 56 connected with a pawl slide 57 whereby the pawl is biased into engagement with the toothed periphery of the ratchet wheel 46 so that the to and fro oscillation of the handle about the axis of shaft 44 will impart rotative step by step movement through the ratchet wheel 46 to shaft 44 to rotate such shaft.

As the shaft rotates, it winds upon itself the ends of a cable 58 to which tension spring 26 is anchored at 59 as shown in Fig. 6. Thus, the spring 26 can be left unloaded, or substantially unloaded, during the cocking of the catapult arm 20 and can be loaded with little effort after the arm is cocked and to any desired degree of tension.

It will be understood that the features shown in this embodiment may be used individually or collectively as may be desired, it being unnecessary to have both the impact neutralizing arm 40 and the spring tensioning device 44, 46, 50 in the same embodiment.

The embodiment shown in Fig. 7 is particularly adapted to be operated from docks or piers or other hard surfaced areas. There is a base 60 from which the U-shaped frame 10 extends upwardly in the manner already described. However, the base is desirably pivotally connected to the frame 10 at 61, and the angle of the frame is determined by adjusting the point of connection of braces 62 with frame 10, the braces being fastened at their outer ends to the base 60.

The catapult arm 201 here comprises a lever pivoted at 181 to the frame and provided at its longer end with a bait receiving pocket 211 and at its shorter end with a foot pad 65.

With the lever 201 in the position shown in full line, the operator places his left foot on the base at 66 and strikes the pad 65 sharply with his other foot, thereby oscillating lever 201 at high speed in a clockwise direction until it is stopped abruptly by contact with the bumper 25, whereupon the bait will be thrown outwardly from the pocket 211. As before, the trajectory will be determined by the angle of the lever at the point when it engages the bumper.

I claim:

1. A mechanical bait casting device comprising a frame having a bumper portion, a pivoted catapult arm movable to said portion, means on the arm for supporting the bait to be cast for projection when the lever engages the bumper portion, and means for effecting movement of the arm toward engagement with said bumper portion, in further combination with an impact neutralizing arm pivoted to said frame for movement to and from said bumper at the side thereof opposite to the side engaged by the catapult arm, and means interconnecting the catapult arm and the impact neutralizing arm for movement oppositely and concurrently to and from said bumper.

2. A device of the character described comprising an inverted U frame provided with base and brace means for maintaining it approximately upright at a predetermined angle, a bumper carried by said frame adjacent its upper end, catapult arm support means intermediate the height of the frame including a substantially upright bracket arm having a transverse pintle at its upper end and a spring anchor at its lower end, a catapult arm pivoted on the pintle and having a free end portion movable from and to said bumper and a rearwardly extending spring lever portion, a spring connecting said spring lever portion to said spring anchor whereby the catapult arm can be propelled sharply about its said pintle to said bumper, and means at the free end portion of the catapult arm for supporting a bait to be catapulted upon engagement of the free end portion of the arm with the bumper.

3. The device of claim 2 in which said bracket arm is further provided with detent means for restraining the catapult arm from movement toward said bumper.

4. The device of claim 2 in which the base means comprises broad supporting surfaces, and the brace means has an adjustable connection with said frame for the variation of its angle.

5. A mechanical bait casting device comprising an adjustable frame having a top portion with a bumper mounted thereon, a bottom portion comprising a base for the frame and a catapult arm support means mounted on the frame intermediate said top and bottom portions thereof, said means including a transverse pintle, a catapult arm pivoted on the pintle and having a free end portion swingable from and to said bumper, said catapult arm support means further including means for latching said catapult arm in a cocked position substantially about 180° arcuately spaced from its position in engagement with the bumper, a spring connected to said catapult arm support means and to said arm for motivating said catapult arm from its cocked position through substantially 180° of arcuate swinging movement about its pintle and into engagement with said bumper, said frame further comprising a cross member, said catapult arm support means having a releasable connection to said cross member, said catapult arm support means comprising a bracket arm having one portion extending upwardly above the level of said cross member and to which said pintle is connected and a second portion extending downwardly below said cross member and to which said spring is anchored, said latching means being mounted on said bracket arm intermediate said pintle and said spring anchorage.

References Cited in the file of this patent

UNITED STATES PATENTS

| | | |
|---|---|---|
| 266,980 | Easton | Nov. 7, 1882 |
| 502,299 | Keane et al. | Aug. 1, 1893 |
| 894,738 | Hindmarsh | July 28, 1908 |
| 1,162,910 | Goude | Dec. 7, 1915 |
| 1,182,024 | Macleod et al. | May 9, 1916 |
| 1,733,394 | Bible et al. | Oct. 29, 1929 |
| 1,827,023 | Keseleff | Oct. 13, 1931 |
| 1,841,390 | Welch | Jan. 19, 1932 |
| 2,146,156 | Nicot et al. | Feb. 7, 1939 |
| 2,318,139 | Calabrese | May 4, 1943 |
| 2,696,204 | Gilgoff | Dec. 7, 1954 |

FOREIGN PATENTS

| | | |
|---|---|---|
| 958,526 | France | Sept. 12, 1949 |